United States Patent
Curtin et al.

[15] 3,706,111

[45] Dec. 19, 1972

[54] BRUSH BRISTLES

[72] Inventors: Dennis Edward Curtin, Parkersburg, W. Va.; John Edward Hansen, Wilmington, Del.

[73] Assignee: E.I. du Pont de Nemours and Company, Wilmington, Del.

[22] Filed: Aug. 21, 1970

[21] Appl. No.: 66,145

Related U.S. Application Data

[60] Division of Ser. No. 785,390, Dec. 19, 1968, abandoned, and a continuation of Ser. No. 66,661, Aug. 24, 1970, abandoned.

[52] U.S. Cl. ............15/159 A, 15/159 R, 161/177, 161/179, 260/75 R, 264/210 F, 264/290 T
[51] Int. Cl. .....................A46b 1/00, A46d 1/00
[58] Field of Search.161/177, 179; 15/159 R, 159 A; 260/75 R

[56] References Cited

UNITED STATES PATENTS

| | | | |
|---|---|---|---|
| 2,292,905 | 8/1942 | Smith | 15/159 R |
| 2,433,325 | 12/1947 | Slaughter | 161/179 |
| 2,465,319 | 3/1949 | Whinfield et al. | 161/172 |
| 2,615,784 | 10/1952 | McClellan | 8/151 |
| 3,295,156 | 1/1967 | Brant | 15/159 R |
| 3,402,416 | 9/1968 | Shaw et al. | 161/179 |
| 3,405,098 | 10/1968 | Heighton et al. | 260/75 |
| 3,344,457 | 10/1967 | Grobert | 15/159 A |

Primary Examiner—Robert F. Burnett
Assistant Examiner—Lorraine T. Kendell
Attorney—William A. Hoffman

[57] ABSTRACT

Paint brush bristles formed from polybutylene-1,4-terephthalate exhibiting superior bend recovery and initial modulus of elasticity in flex as well as in paint solvents, satisfactory temperature dependence of modulus and amenability to flagging and tipping.

8 Claims, No Drawings

BRUSH BRISTLES

This is a division of application Ser. No. 785,390 filed on Dec. 19, 1968 by Dennis Edward Curtin and John Edward Hansen, now abandoned and refiled as a continuation application Ser. No. 66,661 on Aug. 24, 1970, now abandoned.

BACKGROUND OF THE INVENTION

In the past, paint brush bristles have been made from natural bristle and from various synthetic resins. The better paint brush bristles have been formed from polyamides of which poly(hexamethylene sebacamide) is generally regarded as the best, due to its tensile modulus, bend recover/ and amenability to flagging and tipping. These bristles suffer from a general loss of physical properties when used in conjunction with water base paints such as the common latex wall paints and house paints as well as when used in conjunction with alcohol base coatings such as shellac, because the water or alcohol dissolve in and soften or plasticize the bristle.

In the past, polyesters have been regarded as unsatisfactory for use in forming paint brush bristles. The common polyester is poly(ethylene terephthalate) which is unsatisfactory for use in forming paint brush bristles due to poor bend recovery, too high a modulus (bristles are too stiff), poor amenability to tipping and bad amenability to flagging. Other polyesters based on terephthalic acid have been found to be unsatisfactory for forming paint brush bristles. Poly(propylene terephthalate) is unsatisfactory for use in forming paint brush bristles due to too low a modulus (bristles are not stiff enough), poor processability of the filaments due to excessive shrinkage during heat setting, which causes an excessive number of breaks, and bad amenability to flagging. Poly(pentylene terephthalate) has been found not to be spinnable into bristle filaments. Poly(hexylene terephthalate) is unsatisfactory for use in forming paint brush bristles because of poor retention of modulus (stiffness or modulus of elasticity in flex) in several paint solvents and a substantial change in modulus in the temperature range typically experienced in painting (20°–30° C).

SUMMARY OF THE INVENTION

It has now been found that poly(butylene-1,4-terephthalate) is unique among the polyesters based on terephthalic acid in having the balance of properties, i.e., excellent bend recovery, satisfactory initial modulus and wet modulus in paint solvents, excellent ease of processability into filaments, satisfactory temperature dependence of modulus, along with excellent amenability to flagging and satisfactory amenability to tipping.

In carrying out the present invention, a filament of from 6 to 40 mils diameter is spun or extruded from poly(butylene-1,4-terephthalate) having an inherent viscosity of from 0.5 to 1.5 (as measured from a 0.5 g solution in 100 ml of 40/60 tetrachloroethane/phenol). The filament is then oriented by drawing from about 3.5 to about 5.5 times its original length. The conventional slow-fast roll arrangement is suitable for orienting the filament. A single drawing stage is suitable, although a two or three stage drawing operation can be used if desired. In an especially preferred aspect of the invention, the tapered filament take-off device such as described in U.S. Pat. No. 2,418,492 is used to produce tapered filament from the extruder prior to orienting. When forming such a tapered filament, the draw or orientation ratio of the filament at the base of each bristle should be from about 3.5 to 4.5X while the draw ratio of the tip should be from 3.5 to about 5.5X. The diameter of the tip of such a tapered filament prior to tipping preferably is from 0.5 to 0.75 times the diameter of the base of the bristle. Thus, in the case of tapered bristle the maximum diameter of the bristle may vary from 6 to 20 mils and the minimum diameter may vary from 3 to 15 mils. The drawing operation may be carried out at from 25° to 100° C in a liquid such as water, or 300° to 400° C in a gas such as air. the preferred temperature for use with a liquid bath is from 70° to 90° C. This heating may readily be carried out by means of electric heaters by blowing a heated gas over the filament, or by passing the filament through a heated liquid bath.

The filament preferably is heat set after drawing for good bend recovery. While the heat setting operation may be carried out with or without the application of tension, it is preferred to allow the filament to relax in length from 5 to 15 percent during the heat setting operation. This relaxation during heat setting generally results in improved straightness of the filament, although relaxation is not always needed to achieve adequate straightness. The heat setting can be carried out either in a gas such as by blowing hot air over the filament, or in a liquid bath such as by passing the filament through a bath of oil. The filament should remain in the heat setting stage for from 30 to 90 seconds in a gas, or from about 2 to 10 seconds in a liquid bath. Temperatures of from 150° to 200° C are suitable for the heat setting operation when using a gas, and temperatures of from 140° to 200° C when using a liquid bath.

The filaments are then cut to length to form individual bristles, which are gathered into bundles of from about 1 to 2 inches in diameter to be tipped and flagged. Conventional tipping and flagging apparatus such as described in U.S. Pat. Nos. 2,697,009 and 2,911,761, is suitable for this operation. Preferably, the tipping is performed on a wet abrasive wheel using a mixture of water and a lubricant such as Sulfo 5000 made by Sulfo, Inc., as a coolant and a tipping aid. Bundles of untipped filaments (all of one length) are placed in chucks, and the tips of the filaments are passed over a series of abrasive wheels to grind approximately the end three-eights inch of the tip of each filament to a fine point.

The flagging operation can be performed by passing a bundle of the tipped bristles over a series of rotating knives in which case most of the bristles have a bushy tip having about four to 10 fuzzy flags. It is preferable to wet the bundles before flagging with a solution such as a mixture of water and a lubricant such as used in the tipping operation. The conventional flagging machines presently used commercially for flagging polyamide and other paint brush bristles are suitable for use in the present invention. Optionally, the bristles can be "microflagged." This is most readily done by making up a brush of tipped but not flagged bristles. The tips of the bristles are then beaten by rods or similar means which means have small projections or ridges such as threads on a screw. Microflagged bristles generally have 10 to 20 micro-hair divisions at the tip.

Paint brush bristles made from poly(butylene-1,4-terephthalate) and processed in the above manner exhibit fine slender tips and strong multi-end flags which are unobtainable with conventional polyester filaments.

DESCRIPTION OF THE PREFERRED EMBODIMENTS

EXAMPLE I

Poly(butylene-1,4-terephthalate)flake having an inherent viscosity of 0.7 as measured from a 0.5 g percent solution in 100 ml of 60 percent phenol and 40 percent tetrachloroethane is dried in an oven at 100° C for 20 hours with a nitrogen sweep and an additional 24 hours at 160° C with a nitrogen sweep to dry the flake. The flake is then charged to a 1¼ inch single screw extruder arranged with its discharge coupled directly to the intake of a metering gear pump. The melted polymer in the extruder is maintained at 255° C. The gear pump forces the melted polymer through a screen-pack and breaker-plate assembly and then through a three-hole spinneret, having holes 40 mils in diameter. Discharge from the spinneret is vertically downward into a cold water quench bath maintained at 25° C. The surface of the water is about 1 inch below the spinneret. The take-off arrangement employs rubber pinch rolls which are operated at a cyclically varying surface speed as described in U.S. Pat. No. 2,418,492, which results in a correspondingly varying strand diameter of from 16 mils minimum diameter to 24 mils diameter maximum with approximately 2½ inches repeat distance between points of maximum and minimum diameter. These "tapered" filaments are drawn from 4 to 4.2X with a conventional "slow roll-fast roll" arrangement using a short tubular furnace maintained at 350° to 400° C air temperature between the slow roll and fast roll as a draw assist.

The filament is wound up on a spool and then in a second operation the filament is passed through a hot air conditioning oven maintained at 170° to 180° C with a residence in the oven of about 40 seconds. The filament is permitted to relax in length 10 percent as it passes through the oven to improve the straightness of the filament when cut and bundled as bristle. The heat setting also serves to maximize the bend recovery of the final product.

After spinning, drawing, and heat setting as a continuous length filament, the filament is cut at each point of minimum diameter and the pieces, which are at least twice the length of the desired product, in this case about 10 inches long, 12 to 8 mil maximum to minimum diameters, gathered into double taper bundles. These are then trimmed to single taper bundles of 3½ to 4 inch lengths. The bristles are then tipped by contacting the end one-half to five-eights inch of about 1½ inch diameter bundles of filaments, using a multiple pass, with 10-inch diameter, 1-inch width, No. A 46–05VI type grinding wheels while holding the filaments in a chuck which revolves continuously to expose all sides of the filaments to the grinding wheels. During this operation an aqueous solution containing 2 percent Sulfo 5000 lubricant is continuously sprayed onto the bundles and grinding wheels to act as a coolant and tipping aid.

The bristles are then flagged by passing the bundles of the tipped bristles over a series of 48, 3-inch diameter rotating pointed blades in a Baer flagging machine. This operation splits the tips of nearly all of the bristles into four or more parts (flags). The bristles are wetted with the same aqueous solution used in the tipping operation. The depth of flagging can readily be varied from one-eighth to one-fourth inch by adjusting the interface between the knives and the bundle tips. The choice of flag depth is governed by the bristles length and the type of brush desired. These bristles can be split into a distinctly greater number of flags than has been found possible using similar processes with polyamide or poly(ethylene terephthalate) bristles.

The bristles are then made up into a 4-inch wide, 1-inch thick paint brush containing 100 grams of filament of which 70 percent are flagged to a depth of between three-sixteenths and one-fourth inch. When tested using an oil base paint containing 35 percent vehicle and 65 percent pigment of which the vehicle composition is 3 percent drier, 70 percent aliphatic hydrocarbons and 27 percent soya alkyd resin, and the pigment contains 21 percent titanium dioxide, 3 percent zinc oxide, 74 percent calcium carbonate and 2 percent diatomaceous silica, the brush exhibits a "dump" of 4.5 grams, a "paint release" of 22.9 grams, and a "coverage" of 155 square inches.

As used herein, "paint release" is the average weight of paint transferred from a dipped brush to a surface during painting by the brush in a standard apparatus. The brush is prepared for the test by soaking in mineral spirits for 24±4 hours, and allowed to air dry for 24±4 hours. The bristle is then combed four times, starting at the heel and stroking forward to the tip. The brush is then conditioned for 24±4 hours at 23±2° C and 50±5 percent R.H. The viscosity of the paint used is measured to obtain uniformity when comparative tests on various brushes are made. The brush is mounted in the holder of a painting machine so the tip would extend beyond the surface if it were not deflected by that surface to an extent equal to three-eighths of the length of the bristles clear of the ferrule. The brush and holder is weighed. The brush is dipped into the paint to a depth equal to one-half the length of bristle clear of the ferrule for 3±0.1 minutes. The brush is then raised and allowed to drip for 60 seconds and the brush and holder then reweighed. With paper in place the brush is placed in the painting machine and the brush allowed to paint for a total of 60, 35-inch strokes changing paper every 20 strokes. The brush and holder is reweighed. The brush is redipped in the paint to the same depth as above, but for 30 seconds, allowed to drip for 30 seconds, and the above painting and weighing procedure repeated. This last procedure is repeated until five consecutive runs have a range of 2.0 g or less, or until 15 values have been obtained. The figures reported are averages of these values.

The "dump" is determined by the same starting procedure as in the "paint release" test by dipping the brush into the paint to a depth equal to one-half the length of the bristle clear of ferrule for 3±0.1 minutes. The brush is then raised and allowed to drip for 60 seconds. The brush is then placed in the painting machine and a black Morest form 4 inches wide and only 4½ inches long is painted with one stroke, and the cardboard form then weighed. The "dump" is the amount of paint delivered onto the 4 ×4½ inch form in this first stroke.

"Covering ability" is determined with a brush which has just completed the paint release test by dipping it in the paint in the standard manner for 30 seconds, raising it and allowing it to drain for 30 seconds.

A black Morest Co. form (35 inches long and 4 inches wide) is placed in the painting machine at the middle of the painting patch of the brush and the cardboard form painted using the number of strokes required to completely cover the panel up to a minimum of six strokes. The Morest form is removed and allowed to dry. Without redipping the brush, additional Morest forms are completely covered. The test is repeated four more times. When the paint has dried, the number of square inches of area covered by the brush after each of the five dips is determined. Any squares which have any uncovered black surface are excluded from the count. The average of the four covering ability values which gives the smallest range of numbers is then reported as the covering ability of the brush.

When tested on rubber base latex exterior house paint containing 37 percent pigment and 63 percent vehicle, in which the pigment consists of 50 percent titanium dioxide and 50 percent silicates, and the vehicle consists of 23 percent of non-volatile (petroleum) latex and 77 percent water, the brush exhibits a dump of 4.9 grams, a paint release of 21.4 grams, and a coverage of 304 square inches. All percentages are given by weight.

The 4-inch brush has a stiffness of 815 grams as measured by pressing the tips of the bristles of the brush while being held at 10° from vertical against the horizontal pan of a balance at a distance to cause a deflection of the bristles equal to three-eighths the length of the bristles as measured from their tips to the ferrule of the brush.

EXAMPLE II

Example I is repeated except using poly(butylene-1,4-terephthalate) flake having an inherent viscosity of 0.8 as measured from a 0.5 percent solution in 40/60 tetrachloroethane and phenol and a hot water bath maintained at 80° C is used as the drawing assist rather than the hot air tubular furnace.

EXAMPLE III

Example I is repeated except the surface of the poly(butylene-1,4-terephthalate) flake is surface coated with 0.3 weight percent of brown acid dye. The bristle tips and flags similarly to the bristles formed by Example I.

EXAMpLE IV

Poly(butylene-1,4-terephthalate) flake having an inherent viscosity of 0.7 as measured from a 0.5 percent solution in 40/60 tetrachloroethane/phenol is dried in an oven at 100° C for 20 hours with a nitrogen sweep and an additional 24 hours at 160° C with a nitrogen sweep to dry the flake. The flake is then charged to a 1¼ inch single screw extruder arranged with its discharge coupled directly to the intake of a metering gear pump. The melted polymer in the extruder is maintained at 240° C. The gear pump forces the melted polymer through a screen pack and breaker plate assembly and then though a spinneret having 14 holes 30 mils in diameter. Discharge from the spinneret is vertically downward into a cold water quench bath maintained at 25° C. The surface of the water is about one-half inch below the spinneret. The take-off arrangement employs rubber pinch rolls which are operated at a constant speed to produce filaments having a diameter of 10 mils. These filaments are then drawn 4× with a conventional slow roll-fast roll arrangement using a short water bath maintained at 85° C between the slow roll and fast roll as a draw assist and approximately a 1-second contact time in the water bath.

The filament is wound up on a spool. In a separate operation the filaments are placed between clamps 62 cm apart and the separation adjusted for a 10 percent relaxation. The assembly is then placed in an air oven maintained at 170° C for 30 seconds.

The physical properties of the filaments are determined by the following methods on filament stored at 23° C and 50 percent relative humidity for at least 2 days after the hot air conditioning. The tensile strength for a filament having a diameter (D) in inches and a break load (BL) in pounds as measured on an Instron Universal Tensile Tester using a 10-inch gap and drawing at 10 inches per minute at 23° C and 50 percent RH is calculated by the following equation:

$$\text{Tensile strength (in psi)} = 4BL/\pi D^2$$

Ultimate elongation is determined from the Instron chart by dropping a perpendicular from the break point to the time axis of the chart, then measuring the distance ($C'$) along the time axis from the point where said perpendicular hits the axis to the beginning of the load-time curve, calculating ultimate elongation by the following equation wherein L is the initial gauge length in inches and m is a chart magnification that is the ratio of chart speed to cross head speed $$\text{Ultimate elongation (in percent)} = 100C'/Lm$$

Tensile modulus is also determined in an Instron Universal Tensile Tester using a 10-inch gap and drawing at 1 inch per minute at 23° C and 50 percent RH and is calculated by the following equation wherein $C$ is distance on the Instron Chart in inches and $P$ is the load in pounds at that point:

$$\text{Tensile modulus (in psi)} = 4PmL/D^2C$$

Based on these tests, the filament has a tensile modulus of 594,000 psi, a tensile strength of 40,000 psi, and an ultimate elongation of 34 percent. It also has a "mandrel bend recovery" of 97 percent as determined by wrapping the filament 10 or more times around a 93-mil mandrel using 50 gm tension, noting the number of wraps, waiting 4 minutes and then cutting the monofilament off the mandrel and placing the filament in water at 23° C and allowing it to relax for 1 hour and again noting the number of loops after recovery. The percent recovery is calculated from the following equation:

percent recovery $$= \frac{\text{(initial number of loops} - \text{number of loops after relaxation)}}{\text{initial number of loops}} \times 100$$

the filament has a wet tensile modulus of 541,000 psi determined as described above except the filament is tested after immediate removal from distilled water. The sample has been previously immersed for 48 hours in water. This represents a tensile modulus ratio wet/dry of 0.91. Tensile modulus is measured here because it is easily determined accurately while the flexural modulus which measures stiffness is difficult to obtain with any degree of accuracy. Both of these moduli are known to be nearly equal on materials of this type, and thus tensile modulus is used for convenience.

EXAMPLE V

Example IV is except poly(butylene-1,4-terephthalate) flake having an inherent viscosity of 0.97 as measured from a 0.5 g solution in 100 ml of 40/60 tetrachloroethane/phenol is used, and a 4.1× draw is used followed by a 1.3× draw using a "Ucon" oil SOHB260, a polyalkylene glycol bath at 115° C as the assist to give an overall draw ratio of 5.35×. The filament is heat set at 190° C at constant length with a 60-seconds residence time. The filament has a tensile modulus of 593,000 psi, a tensile strength of 82,500 psi, an ultimate elongation of 23 percent, a mandrel bend recovery of 92 percent, and a wet tensile modulus of 567,000 psi, thus representing a modulus ratio wet/dry of 0.96. The test results reported in the Example are determined by the tests described in Example IV.

EXAMPLE VI

Example I is repeated except poly(butylene-1,4-terephthalate) prepared in accordance with the teachings of U.S. Pat. No. 3,405,098, and having an inherent viscosity of 1.2 as measured from a 0.5 g solution in 100 ml of 40/60 tetrachloroethane/phenol is used, an extruder melt temperature of 270° C is used, and the water bath is maintained at 80° C. Brushes made from these bristles which have been tipped and flagged as in Example I are found to exhibit outstanding painting qualities along with exceptional durability.

EXAMPLE VII

Example I is repeated except poly(butylene-1,4-terephthalate) prepared in accordance with the teachings of U.S. Pat. No. 3,405,098, and having an inherent viscosity of 1.2 as measured from a 0.5 g solution in 100 ml of 40/60 tetrachloroethane/phenol is used, an extruder melt temperature of 270° C is used and the water bath is maintained at 80° C. The bristles are tipped by the procedures of Example I but not flagged. A 4-inch brush is made up from these tipped but not flagged filaments, which are then "microflagged" as follows: A 12-inch diameter metal plate one-half inch thick is attached at its center to a shaft which can be rotated at 3,450 r.p.m. by an electric motor. At the outer edge of the steel plate three hardened cap screws are screwed into holes and extend out 1½ inches at right angles to the plane of the circular steel disk. These cap screws are ¼-inch diameter and have a conventional screw thread. The circular metal disk with its projecting cap screws is then rotated at 3,450 r.p.m. The paint brush is then inserted through a guard and the ends of the paint brush bristles are struck by the sides of the threaded cap screws (with the axis of the screws at right angles to the axis of the bristles). The brush is held against the rotating cap screws for a total of 30 seconds while striking one side only of the flat side of the 1 × 4 inch wide brush from which the bristles extend 3⅝ inches. The difference in the appearance of the bristles is dramatic for the poly(butylene-1,4terephthalate) after the 30-second treatment.

The "microflagging" produces very fine diameter microhairlike ends as compared with the more conventional flagging which is produce by splitting the ends of the bristles with sharp rotating knife disks with the plane of the disk parallel to the axis of the bristles. After microflagging, the end of the bristle generally has from 10–20 of these microhair divisions for each poly(butylene-1,4-terephthalate) bristle.

This brush exhibits superior painting qualities.

We claim:

1. An article of manufacture comprising oriented, heat-set bristles of a length suitable for use in a paint brush, the bristles having a minimum diameter of 3 mils and being composed of poly(butylene-1,4-terephthalate) having an inherent viscosity of from about 0.5 to about 1.5 as measured from a 0.5 g. solution in 100 ml. of a solvent consisting of 40 percent tetrachloroethane and 60 percent phenol.

2. The article of claim 1 wherein the bristles are tipped and flagged.

3. The article of claim 2 wherein the bristles are tapered and have a base from 6 to 20 mils in diameter and a minimum diameter from 0.5 to 0.75 the diameter of the base.

4. The article of claim 3 wherein the bristles have been microflagged to produce about 10–20 microhair divisions at the tipped end of the bristles.

5. A paintbrush comprising oriented, heat-set bristles of poly(butylene-1,4-terephthalate) having a minimum diameter of 3 mils and an inherent viscosity of from about 0.5 to about 1.5, as measured from a 0.5 g. solution of a solvent consisting of 40 percent tetrachloroethane and 60 percent phenol.

6. The paint brush of claim 5 wherein the bristles are tipped and flagged.

7. The paint brush of claim 5 wherein the bristles are tapered and have a maximum diameter in the range of 6 to 20 mils and a minimum diameter in the range of 3 to 15 mils.

8. The paint brush of claim 6 wherein the bristles have been microflagged to produce about 10–20 microhair divisions at the tipped end of the bristles.

* * * * *